United States Patent [19]

Oberly et al.

[11] Patent Number: 4,711,825
[45] Date of Patent: Dec. 8, 1987

[54] COMPOSITE ALUMINUM CONDUCTOR FOR PULSED POWER APPLICATIONS AT CRYOGENIC TEMPERATURES

[75] Inventors: Charles E. Oberly, Urbana; Harold L. Gegel, Kettering, both of Ohio; James C. Ho, Wichita, Kans.

[73] Assignee: The United States of America as represented by the Secretary of the Air Force, Washington, D.C.

[21] Appl. No.: 849,989

[22] Filed: Apr. 10, 1986

[51] Int. Cl.$^4$ .............................................. H01B 1/02
[52] U.S. Cl. ..................... 428/614; 428/654; 174/126 CP
[58] Field of Search ............ 428/930, 614, 654; 29/599; 174/126 CP, 126 S, 128 S; 419/8, 28; 148/11.5 Q

[56] References Cited

U.S. PATENT DOCUMENTS

| | | | |
|---|---|---|---|
| 3,469,952 | 9/1969 | Baker | 428/614 |
| 3,614,301 | 10/1971 | Roget | 29/599 |
| 3,714,371 | 1/1973 | Nomura et al. | 174/126 CP |
| 3,939,299 | 2/1976 | Raw et al. | 174/23 R |
| 4,109,374 | 8/1978 | Whetstone et al. | 29/599 |
| 4,148,129 | 4/1979 | Young | 29/599 |
| 4,200,767 | 4/1980 | Nomura et al. | 174/126 S |
| 4,285,120 | 8/1981 | Nomura et al. | 29/599 |
| 4,454,380 | 6/1984 | Turowski | 174/128 S |
| 4,506,109 | 3/1985 | Onishi et al. | 174/128 S |

Primary Examiner—John J. Zimmerman
Attorney, Agent, or Firm—Bernard E. Franz; Donald J. Singer

[57] ABSTRACT

The conductor contains high-purity aluminum embedded in an aluminum-iron-cerium alloy matrix. It is not superconducting but still has extremely low electrical resistance at service temperatures. Selection of the aluminum-base alloy matrix with diffusionless alloying elements (iron and cerium) allows production of a multifilamentary conductor with the aluminum filaments maintaining their original high purity and consequently their very low electrical resistivity, even after a high temperature annealing cycle is applied. The composite conductor has good properties for both electromagnetic and thermal diffusion, which are critical to high-power, fast-pulse operation.

4 Claims, 11 Drawing Figures

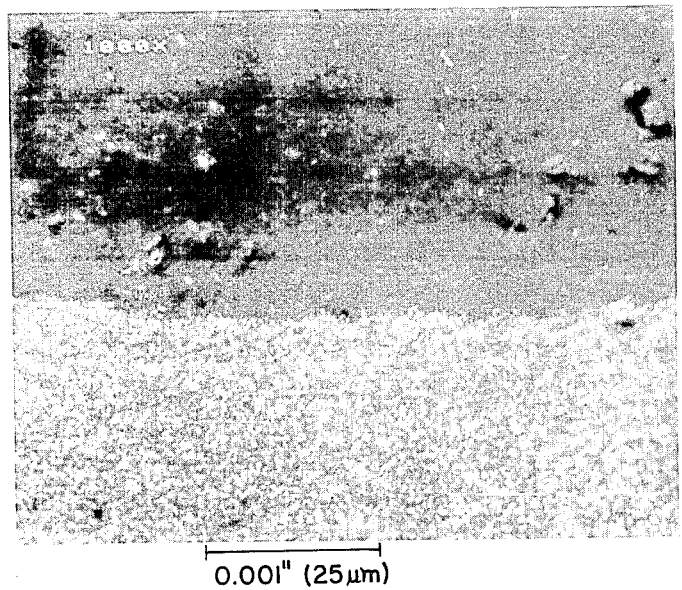
Fig. 4
0.001" (25μm)
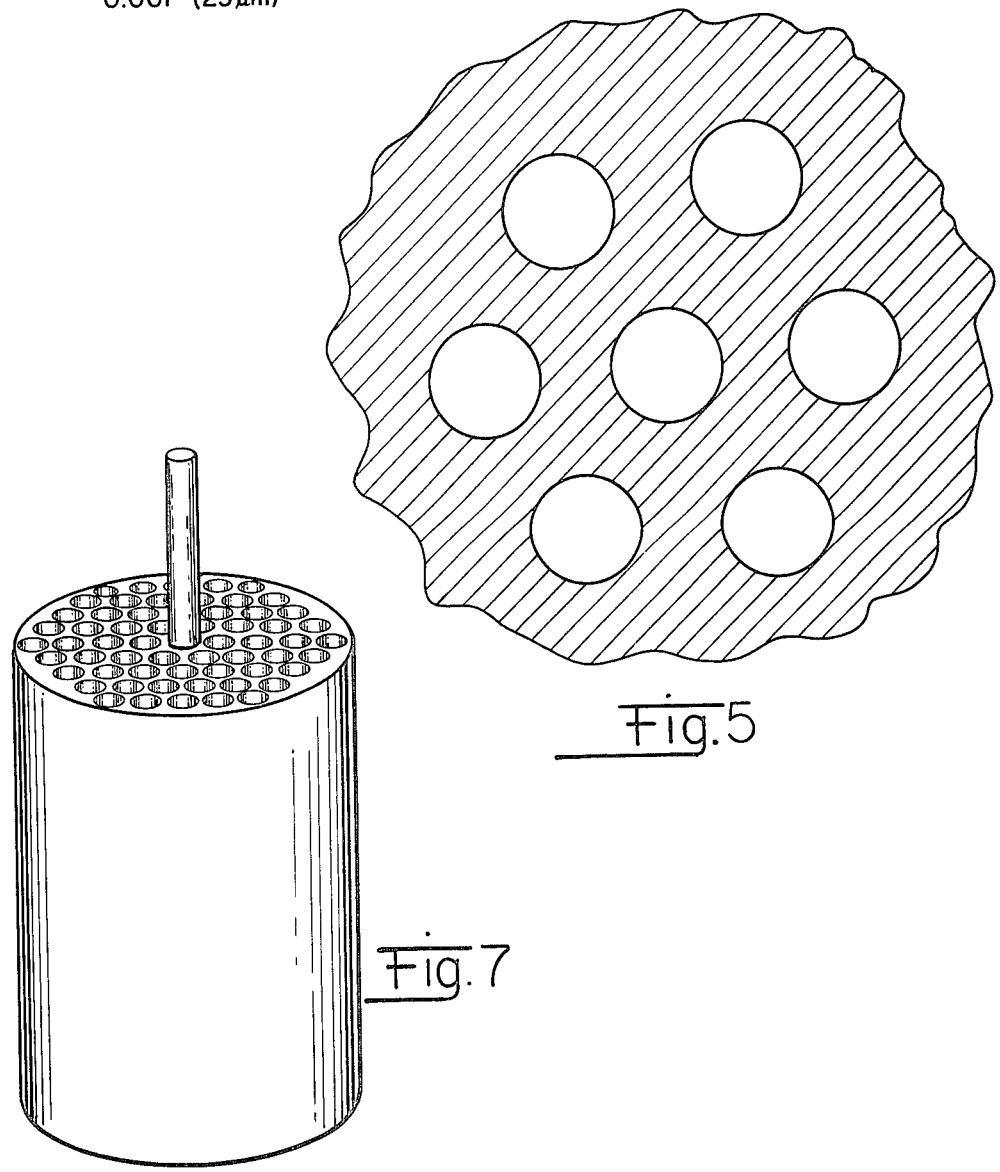
Fig. 5
Fig. 7

Fig. 6A
Fig. 6B
50 μ    25 μ
VHP
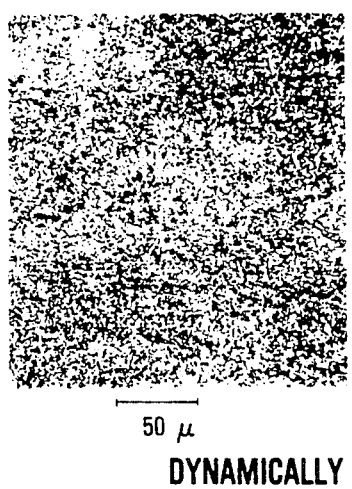
Fig. 6C
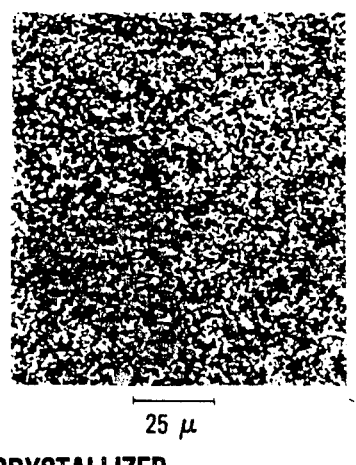
Fig. 6D
50 μ    25 μ
DYNAMICALLY RECRYSTALLIZED
Fig. 6

COMPOSITE ALUMINUM CONDUCTOR FOR PULSED POWER APPLICATIONS AT CRYOGENIC TEMPERATURES

RIGHTS OF THE GOVERNMENT

The invention described herein may be manufactured and used by or for the Government of the United States for all governmental purposes without the payment of any royalty.

BACKGROUND OF THE INVENTION

This invention relates to a composite aluminum conductor for pulsed power applications at cryogenic temperatures.

In aerospace development there is an ever increasing need for devices generating high power pulses. Since the weight factor is also of importance, multifilamentary superconductors have been considered as the most promising materials for windings of rotating machines as well as inductive energy storages. There advantages are based on the practically zero electrical resistance and consequently the very high current densities. Nevertheless, producing and maintaining the extremely low temperatures required for the occurrence of superconducting phenomenon demand liquid helium with normal boiling point of 4K. Peripheral equipment for helium storage and liquefaction adds extra complication and weight to the overall operation of a given power system. But liquid hydrogen is already available as part of the fuel system in certain aerospace programs.

Moreover, for pulsed power applications, transient heat transfer problems are yet to be resolved.

Potential applications of aluminum-conductor devices operating at cryogenic temperatures were considered many years ago. Research and development activities gradually gave way in the early 1970's to the then successful development of multifilament superconductors. However, it is generally recognized that, in special circumstances where liquid hydrogen is available, aluminum conductors may still be attractive. This is particularly true if the overall system weights, including those associated with conductors as well as cryogen liquefaction and storage, is a critical design factor. For practical Al conductors under consideration, the electrical resistivity at 20K is only about twice as high as that at 4.2K. For superconductors, on the other hand, liquid hydrogen does not yield a low enough temperature, and liquid helium is definitely required.

Earlier studies provided a broad range of data in terms of purity, magnetic field, size, strain, and fatigue effect on low temperature resistivity of high purity aluminum. As a result of these studies one would easily identify aluminum as a better cyroconductor than copper for applications where weight and magnetoresistance are among the main concerns. The only major disadvantage for aluminum is its extremely low strength. This fact is even more serious for such applications as pulsed power devices where, in order to allow full current penetration during a short pulse, the conductors must be in the form of fine filaments. One could conceivably braid the filaments with structural materials for mechanical support. However, a better approach would be to embed Al filaments in an appropriate matrix. Manufacturing technology similar to that for producing multifilament superconductors could also be employed if suitable matrix materials can be found.

The matrix material should satisfy several requirements: (1) light weight, (2) high strength, (3) good thermal conductivity, (4) reasonably high electrical resistivity to mimimize eddy current loss and to enhance electromagnetic diffusion rate, (5) workability compatible with that of high purity aluminum, and (6) diffusionless alloying elements, if present. The last requirement is most essential to warrant the high purity of aluminum filaments in the final product. It is indeed this requirement which eliminates all commercially available aluminum based alloys from being considered here.

United States patents in this field include U.S. Pat. No. 4,148,129 to Young which describes an aluminum-stabilized multifilamentary superconductor having a large number of NbTi or Nb$_3$Sn superconducting filaments in an aluminum alloy matrix (commercially pure 1100 alloy) which is stabilized by a high-purity aluminum sheath. An aluminum alloy billet having super-conducting rods symmetrically disposed therein is extruded and a superpure Al sheath then added. The product is copper enclosed and wire drawn; the copper is then removed. U.S. Pat. No. 3,939,299 to Raw et al describes an aluminum alloy conductor wire composed of a certain aluminum-iron-silicon alloy. U.S. Pat. No. 4,200,767 to Nomura et al discloses a superconductor covered with a reinforced aluminum matrix which is obtained by a method comprising cladding a superconductor with an aluminum matrix reinforced with a very small proportion of alumina dispersed therein. Codrawn multifilamentary superconductors are described. Other U.S. patents of interest are U.S. Pat. Nos. 3,714,371 and 4,285,120 to Nomura et al, 4,454,380 to Turowski, and 4,506,109 to Onisha et al.

SUMMARY OF THE INVENTION

An object of the invention is to provide a composite aluminum conductor for pulsed power applications at liquid hydrogen temperatures, to avoid extra weight and electrical power requirements associated with peripheral equipment for helium refrigeration, when liquid hydrogen is already available.

The product according to the invention provides a different kind of cryogenic winding material, not superconducting but still having extremely low electrical resistance at service temperatures. Specifically, it is a composite aluminum conductor designed for high-power and fast-pulsed applications at liquid hydrogen temperatures of near 20K. The conductor contains high-purity aluminum embedded in an aluminum-iron-cerium alloy matrix.

Selection of the aluminum-base alloy matrix with diffusionless alloying elements (iron and cerium) allows production of a multifilamentary conductor with the aluminum filaments maintaining their original high-purity and consequently their very low electrical resistivity, even after a high temperature annealing cycle is applied. The composite conductor has good properties for both electromagnetic and thermal diffusion, which are critical to high-power, fast-pulse operation.

BRIEF DESCRIPTION OF THE DRAWING

The drawings are all photomicrographs.

FIG. 4 is a view of the product of FIG. 3 showing well-defined boundaries between aluminum filaments and Al-Fe-Ce alloy matrix.

FIG. 5 is a cross section view of 7 high-purity Al filaments in an Al-Fe-Ce matrix, after being extruded to an area reduction of 16 to 1.

FIGS. 6A-6D show the Al-Fe-Ce alloy before and after dynamic recrystallization.

FIG. 7 shows an initial 3"-diameter alloy billet with 61 holes for ¼"-diameter aluminum inserts.

DETAILED DESCRIPTION

Figure 1:
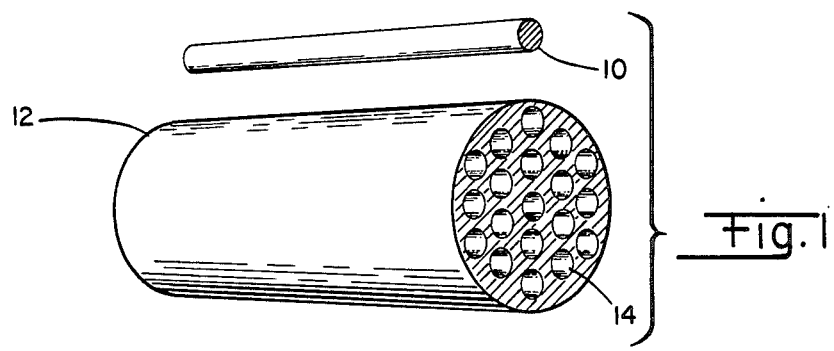
FIG. 1 is a pictorial view of one aluminum rod and an Al-Fe-Ce alloy ingot.

The invention is disclosed in papers by J. C. Ho, C. E. Oberly, H. L. Gegel, W. T. O'Hara, J. T. Morgan, Y. V. R. K. Prasad, and W. M. Griffith, presented at the 5th IEEE Pulsed Power Conference, June 10-12, 1985, Arlington, Va.; at the International Cryogenics Conference, MIT, Cambridge, Mass., Aug. 12-16, 1985; and at the 3rd Symposium on Space Nuclear Power Systems, Jan. 13-16, 1986, Albuquerque, N.Mex. Copies of these papers are attached hereto and are hereby incorporated by reference. Also of note are the reference cited in these papers.

This invention deals with a new conductor composed of high-purity aluminum in an aluminum-iron-cerium (Al-Fe-Ce) alloy matrix. It can be used as winding material in high-power, fast-pulse devices whenever liquid hydrogen (20K) is present.

In order for a conductor to carry large current densities without appreciable temperature rise, it must have very low electrical resistance as the first requirement. For a normal metal, the electrical resistivity decreases drastically with decreasing temperature at low temperatures, provided that the metal is of high purity and defect free. For high purity aluminum it has been known that the resistivity at 20K can be much less than 1/1000 of its room temperature value.

Because of the practical constraints imposed by the presence of matrix material and the manufacturing processes to be described below, high purity aluminum filaments in the new conductor will have a 20K-resistivity of about 1/500 of the room-temperature value. The very small diameter of the filaments also ensures that the eddy current loss is very low and the time constant for current penetration is short. When coupled with a good overall design for effective thermal diffusion, this conductor should present no major problem to the power system as far as Joule heating is concerned. It should also be noted that the selection of aluminum over copper, another low resistivity metal, is due to weight and magnetoresistance considerations. The alloy matrix provides mechanical support required by the very soft high-purity aluminum filaments. It is a material with built-in dispersion strengthening induced by the alloying elements (iron and cerium) in the base metal (aluminum). The impurities also cause large electrical resistance so that eddy current loss can be ignored.

Apart from these good mechanical and electrical properties, the lightweight matrix material is chosen for several more subtle reasons: First, being metallic, it has reasonably good thermal conductivity required for fast thermal response. Second, its compatible workability with high-purity aluminum allows them to be processed into the filamentary configurations with minimal nonuniform deformation. As a result, no serious filament necking or breaking would occur. Finally, but most import, its alloying elements, iron and cerium, are practically diffusionless during processing. This is necessary because, otherwise, the high-purity filaments would be contaminated by impurity and/or alloying element diffusion during annealing cycles resulting in a great reduction of their electrical conductivity. The composite material is produced in multisteps of extrusion/wire-drawing.

An important feature of the invention is the use of the new Al-Fe-Ce alloy as the matrix. This lightweight material (a density of 2.95 g/cm$^3$) with favorable thermal and electrical properties was initially developed for high temperature applications (See W. M. Griffith, R. E. Sanders, Jr. and G. J. Hildman, "Elevated Temperature Aluminum Alloys for Aerospace Applications", in *High-Strength Powder Metallurgy Aluminum Alloys*, edited by M. J. Koczak and G. J. Hildeman, the Metallurgical Society of AILME, 1982, pp. 209-224; S. D. Krichoff, R. H. Young, W. M. Griffith, and Y. W. Kim, "Microstructure/Strength/Fatigue Crack Growth Relations in High Temperature P/M Aluminum Alloys" ibid. pp. 237-248.). With 8.4% Fe and 3.6% Ce by weight, it derives its strength from densely dispersed fine intermetallic compounds yet to be identifed. Al-Fe-Ce ternary compounds are known to exist under equilibrium conditions. However, the alloy used in this effort was powder-metallurgically synthesized by rapid quenching and consequently, its various phases do not necessarily exactly match those formed under equilibrium conditions.

To successfully fabricate a multifilament aluminum conductor by extrusion, swagging and/or wire-drawing, the matrix material must have suitable microstructure and mechanical properties. This will insure the integrity of the filaments in the product, and eliminate the possibility of crack formation. The starting Al-Fe-Ce material used in this work was prepared from powders through cold-compaction followed by vacuum hot pressing (VHP). It was further recrystallized as described below. The remarkably different microstructures before and after the dynamic recrystallization are shown in FIG. 6. Elimination of prior powder particle boundaries in the VHP material yields a more homogeneous distribution of intermetallic particles in the recrystallized condition. As expected, this process results in a softening of the material. However, even with the associated decrease in room temperature yield strength (from above 410 MPa to 170 MPa, or 25 Ksi vs. 60 ksi) and ultimate tensile strength (form 480 MPa to 250 MPa), as well as an increase in elongation (form 8-10% to 15%), the alloy can still be considered as a good structural matrix material for the multifilament aluminum conductors. It should be pointed out that, once the alloy is in the soft, recrystallized condition, it can be coprocessed with high purity aluminum filaments at much reduced temperatures. This should in turn minimize any possible alloying element diffusion from the matrix to the filaments.

The alloy matrix was coprocessed with high purity aluminum inserts by multistep extrusions with very unifrom deformation—a clear indication of compatible workability. More importantly, significant diffusion of Fe or Ce from the matrix to the aluminum filaments was not detected through residual resistivity ratio (RRR) measurements.

The starting materials for producing the composite conductor in one embodiment which has been made are shown in FIG. 1. Nineteen ¼ inch-diameter rods 10 of commercially pure (99.8%) aluminum were inserted into a close-packed arrangement of drilled through holes 14 in a 2-inch-diameter×4-inch-long Al-Fe-Ce alloy billet 12, prepared as described above.

The composite billet was hot-extruded with a streamlined die to an area reduction of 12:1 (see H. L. Gegel, J. C. Malas, and S. M. Doraivelu, "Process Modelling of P/M Extrusion", in *Innovations in Materials Processing*, edited by G. Bruggeman and V. Weiss, Plenum Press, New York, N.Y., 1985, pp. 137–159). Extrusion processing parameters (temperature and strain rate) were selected based on dynamic materials modelings, such that dynamic recrystallization of the alloy matrix would occur. (The methodology is recently developed by the Air Force Materials Laboratory, for details see Gegel et al Patent application Ser. No. 698,728, filed Feb. 6, 1985, now U.S. Pat. No. 4,617,817, issued Oct. 21, 1986. See also H. L. Gegel, "Material Behaviour Modeling—An Overview", in *Experimental Verification of Process Models*, edited by C. C. Chen, Am. Soc. Metals, Menlo Park, Ohio, 1983, pp. 3–32; and Y. V. R. K. Prasad, H. L. Gegel, S. M. Doraivelu, J. T. Morgan, K. A. Lark, and D. R. Barker, "Modeling of Dynamic Material Behaviour in Hot Deformation: Forging of Ti-6242" pp. 1883–1892, October, 1984). As pointed out above, in comparison with the VHP condition, dynamic recrystallization resulted in a product having lower room-temperature yield strength but much improved microstructure in terms of elimination of prior powder particle boundaries and a more homogeneous intermetallic particle distribution, which then allowed subsequent extrusions to be carried out at lower temperatures.

After the first extrusion, seven sections of the resulting rod are re-stacked into another Al-Fe-Ce ingot (or a commercially pure aluminum ingot) for a second extrusion at 12:1. These processes are repeated until the rod is of such small diameter that wire-drawing can be employed. The wire thus produced can be further arranged into twisted strands or cables according to the device requirements, followed by stress-relieving annealing.

Figure 2:
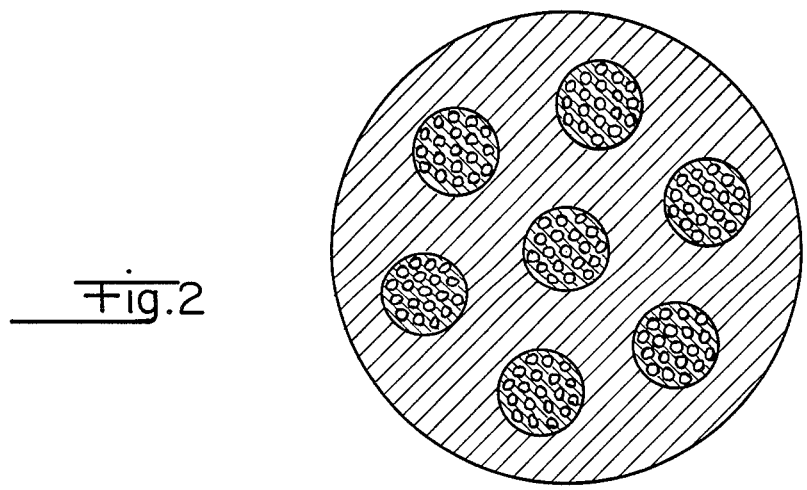
FIGS. 2 and 3 show cross section views of a product resulting from stacking of extruded Al-Fe-Ce/Al sections in an aluminum matrix before and after a second extrusion.
Figure 3:
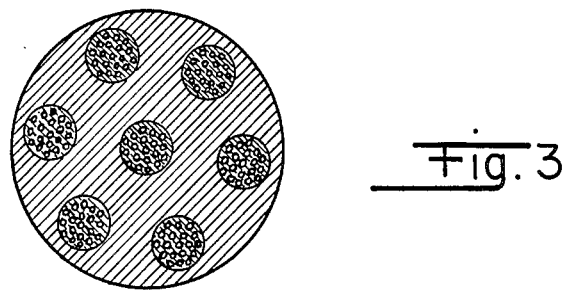

FIGS. 2 and 3 show the 133 Al inserts in Al-Fe-Ce matrix before and after the second extrusion. The cross section geometry is nearly unchanged, and the deformation of Al inserts was reasonable uniform. Micrographs in FIG. 4 show well defined boundaries between the matrix and the inserts. The fact that no cracks developed at these interfaces was also encouraging.

The above observations show that the alloy and pure aluminum can be coprocessed successfully. In fact, part of the 133-filament composite has been further extruded in multisteps to a final diameter of 0.031 inch by the Metals Research Group at Westinghouse R & D Center. This represents an overall area reduction of more than 100,000 times for each Al filament.

A second billet way prepared in the same was as shown in FIG. 1, except that the nineteen commercially-pure Al rods were replaced by seven high-purity (Puratronic grade, 99.998%) Al rods from Johnson Matthey Chemical, Ltd., so that Fe/Ce diffusion evaluations could be made. FIG. 5 shows the cross section of hot-extruded product with an area reduction of 16:1. No detectable Fe or Ce was found in the Al filaments by electron microprobe analysis, setting an upper limit of their concentrations at 100 ppm. Additional verification of this statement was based on residual resistivity ratio (RRR) determinations.

Additional measurements and conclusions for this work are given in the three Ho et al papers attached hereto.

Figure 8:
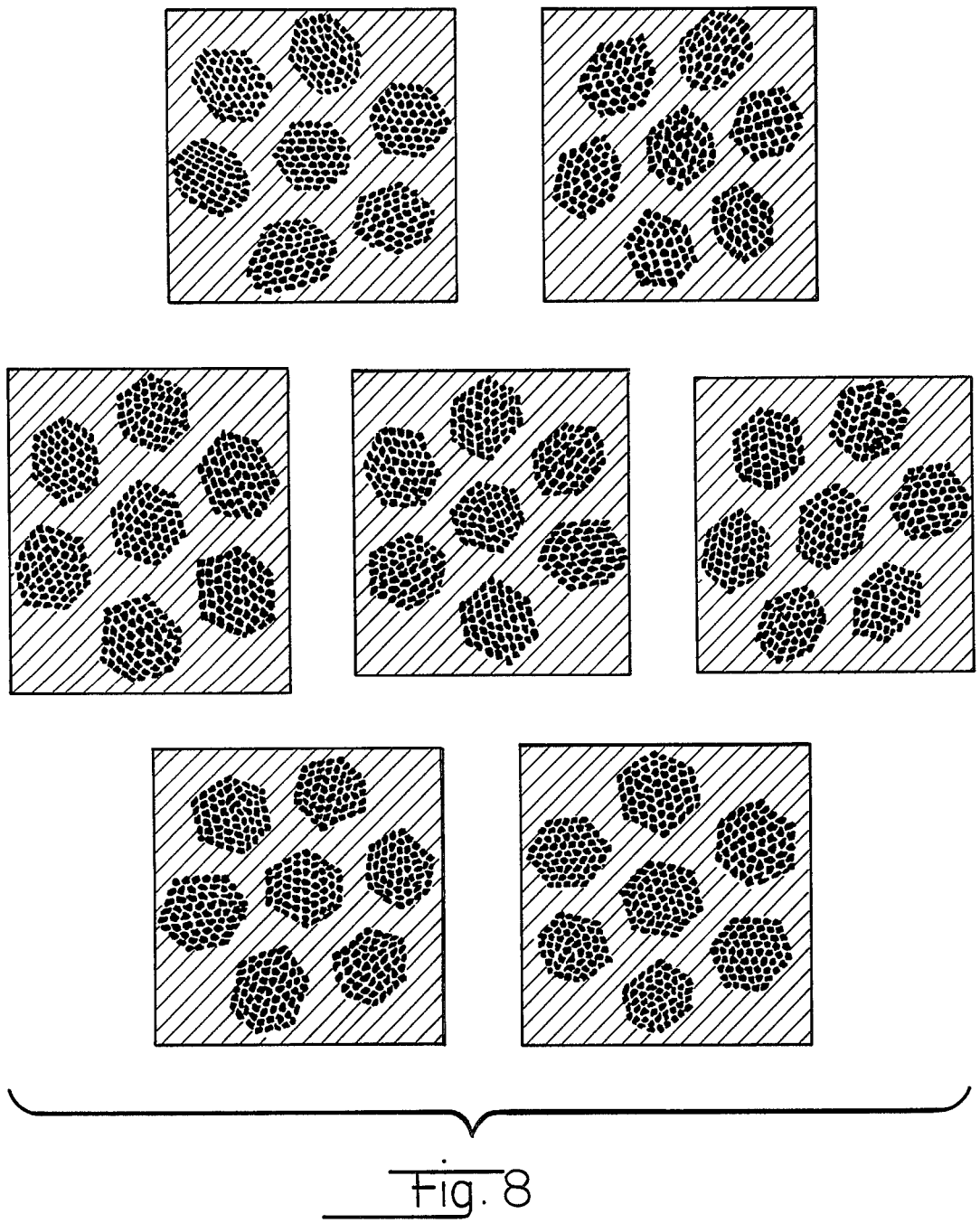
FIG. 8 shows a composite conductor after three extrusions, starting with the billet of FIG. 7.

A most recent demonstative program, with three consecutive (16:1) extrusions, has resulted in composite aluminum conductor having 2,989 (61×7×7) aluminum filaments in an Al-Fe-Ce alloy matrix. FIG. 7 shows the initial 3"-diameter alloy billet with 61 holes for ¼"-diameter aluminum inserts, and FIG. 8 shows the composite conductor after the three extrusions.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A conductor for use at cryogenic temperatures comprising high-purity aluminum filaments embedded in an aluminum based alloy matrix with diffusionless alloying elements, in which said aluminum filaments are at least 99.8% pure, and in which said alloy comprises an aluminum-iron-cerium alloy matrix.

2. A conductor according to claim 1, which is formed by multistep extrusions with very uniform deformation, and no significant diffusion of alloying elements from the matrix to the aluminum filaments.

3. A conductor according to claim 2, in which said alloy comprises 8.4% Fe and 3.6% Ce by weight.

4. A conductor according to claim 3, in which said aluminum filaments are at least 99.998% pure.

* * * * *